(12) United States Patent
Inoue et al.

(10) Patent No.: US 9,205,885 B2
(45) Date of Patent: Dec. 8, 2015

(54) CRAWLER DEVICE AND CRAWLER ROBOT

(75) Inventors: Tomoya Inoue, Kanagawa (JP); Shingo Tsukui, Aichi (JP); Katsuki Fujimoto, Osaka (JP)

(73) Assignees: Independent Administrative Institution, Japan Agency For Marine-Earth Science And Technology, Kanagawa (JP); Topy Kogyo Kabushiki Kaisha, Tokyo (JP)

( * ) Notice: Subject to any disclaimer, the term of this patent is extended or adjusted under 35 U.S.C. 154(b) by 250 days.

(21) Appl. No.: 13/822,819

(22) PCT Filed: Sep. 15, 2011

(86) PCT No.: PCT/JP2011/071138
§ 371 (c)(1),
(2), (4) Date: Apr. 17, 2013

(87) PCT Pub. No.: WO2012/036243
PCT Pub. Date: Mar. 22, 2012

(65) Prior Publication Data
US 2013/0199859 A1  Aug. 8, 2013

(30) Foreign Application Priority Data
Sep. 16, 2010  (JP) .................................. 2010-207944

(51) Int. Cl.
*B62D 55/24* (2006.01)
*B62D 55/205* (2006.01)
(Continued)

(52) U.S. Cl.
CPC . *B62D 55/24* (2013.01); *B60C 7/24* (2013.01); *B60F 3/0015* (2013.01); *B62D 55/00* (2013.01);
(Continued)

(58) Field of Classification Search
CPC ...... B62D 55/00; B62D 55/24; B62D 55/205; B60C 7/24
USPC ......... 305/107, 108, 109, 116, 136, 137, 157; 180/9.1, 9.32; 226/83
See application file for complete search history.

(56) References Cited

U.S. PATENT DOCUMENTS 3,112,727 A * 12/1963 Kiefer ........................ 440/12.63
3,140,887 A *  7/1964 Wallace et al. ................... 291/1
(Continued)

FOREIGN PATENT DOCUMENTS

JP  62-131978 U  8/1987
JP  03-193572 A  8/1991
(Continued)

OTHER PUBLICATIONS

Office Action Issued in Japanese Application No. 2010-207944, Dated Apr. 2, 2013 (7 Pages With English Translation).
(Continued)

*Primary Examiner* — Joseph Rocca
*Assistant Examiner* — Daniel Yeagley
(74) *Attorney, Agent, or Firm* — Osha Liang LLP

(57) ABSTRACT

A crawler device includes a wheel support, wheels respectively rotatably supported thereto, and a crawler belt run around the wheels. Each of the wheels includes a rigid wheel body and an elastic material exterior part fixed to an outer periphery of the wheel body. Raised portions are formed in an outer periphery of the exterior part to continuously extend in a width direction and be arranged in a circumferential direction spaced from each other. Drain grooves extending through the exterior part in the width direction are formed between the raised portions. Top surfaces of the raised portions of the exterior part surface contact an inner peripheral surface of the crawler belt with a frictional force working therebetween. Restriction members stopping opposite side edges of the crawler belt are provided in the wheel support to restrict the crawler belt from being displaced with respect to the wheels in the width direction.

5 Claims, 4 Drawing Sheets

(51) Int. Cl.
   *B60C 7/24* (2006.01)
   *B62D 55/00* (2006.01)
   *B60F 3/00* (2006.01)
   *B62D 55/088* (2006.01)
   *B62D 55/12* (2006.01)
   *B62D 55/14* (2006.01)
   *B62D 55/04* (2006.01)
   *B62D 55/084* (2006.01)

(52) U.S. Cl.
   CPC .............. *B62D 55/04* (2013.01); *B62D 55/084* (2013.01); *B62D 55/088* (2013.01); *B62D 55/12* (2013.01); *B62D 55/14* (2013.01); *B62D 55/205* (2013.01); *Y10S 901/01* (2013.01)

(56) References Cited

U.S. PATENT DOCUMENTS

| | | | | |
|---|---|---|---|---|
| 3,378,314 | A * | 4/1968 | Knowles | 305/112 |
| 4,033,595 | A * | 7/1977 | Mauch | 280/5.22 |
| 4,198,103 | A * | 4/1980 | Ward et al. | 305/165 |
| 5,174,405 | A * | 12/1992 | Carra et al. | 180/9.32 |
| 5,566,773 | A | 10/1996 | Gersmann | |
| 5,938,301 | A * | 8/1999 | Hostetler et al. | 305/199 |
| 6,241,327 | B1 * | 6/2001 | Gleasman et al. | 305/157 |
| 7,416,266 | B2 * | 8/2008 | Soucy et al. | 305/195 |
| 8,776,931 | B2 * | 7/2014 | Boivin | 180/198 |
| 2003/0080616 | A1 * | 5/2003 | Smith et al. | 305/136 |
| 2005/0116540 | A1 | 6/2005 | Katoh et al. | |
| 2006/0278454 | A1 * | 12/2006 | Maggio | 180/164 |
| 2007/0145820 | A1 | 6/2007 | Hirose et al. | |
| 2008/0272647 | A9 * | 11/2008 | Hirose et al. | 305/167 |
| 2008/0284244 | A1 * | 11/2008 | Hirose et al. | 305/165 |
| 2009/0302676 | A1 * | 12/2009 | Brazier | 305/135 |
| 2010/0282526 | A1 * | 11/2010 | Nishida et al. | 180/9.62 |
| 2012/0001478 | A1 * | 1/2012 | Zuchoski et al. | 305/137 |

FOREIGN PATENT DOCUMENTS

| | | |
|---|---|---|
| JP | 08-011550 B | 2/1996 |
| JP | 2001-097259 A | 4/2001 |
| JP | 2002-178962 A | 6/2002 |
| JP | 2004-276685 A | 10/2004 |
| JP | 2006-168661 A | 6/2006 |
| JP | 2007-191153 A | 8/2007 |
| WO | 8702953 A1 | 5/1987 |
| WO | 03078239 A1 | 9/2003 |

OTHER PUBLICATIONS

International Preliminary Report on Patentability Issued in International Application No. PCT/JP2011/071138: Dated: Apr. 9, 2013 (6 Pages).
Patent Abstracts of Japan for Japanese Publication No. 2004-276685, publication date Oct. 7, 2004 (1 page).
Patent Abstracts of Japan for Japanese Publication No. 03-193572, publication date Aug. 23, 1991 (2 pages).
Patent Abstracts of Japan for Japanese Publication No. 2001-097259, publication date Apr. 10, 2001 (1 page).
Patent Abstracts of Japan for Japanese Publication No. 2006-168661, publication date Jun. 29, 2006 (1 page).
Patent Abstracts of Japan for Japanese Publication No. 2002-178962, publication date Jun. 26, 2002 (1 page).
Japanese Office Action for Application No. 2010-207944, mailed on Jan. 8, 2013 (6 pages).
International Search Report issued in PCT/JP2011/071138 mailed Dec. 20, 2011 (4 pages).
Supplementary European Search Report issued in corresponding European Application No. 11825243.6 dated Dec. 10, 2014 (6 pages).

* cited by examiner

CRAWLER DEVICE AND CRAWLER ROBOT

CROSS-REFERENCE TO RELATED APPLICATIONS

This application is a national stage application of PCT/JP2011/071138, filed on Sep. 15, 2011, entitled "Crawler Device and Crawler Robot," which claims priority to Japanese Patent Application No. 2010-207944, filed on Sep. 16, 2010. Each of these priority applications are incorporated herein by reference in their entireties.

FIELD OF THE PRESENT DISCLOSURE

The present disclosure relates to unmanned crawler devices and crawler robots suitable for moving on the soft ground such as seafloor.

BACKGROUND ART

Robots used for underwater exploration, etc. often move on the soft ground (including sandy soil and muddy soil) on the seafloor. Crawler robots are more suitable than wheeled robots for this kind of operations. In wheeled robots, wheels often dig deep into the soft ground, rendering the wheeled robots unable to move. On the other hand, crawler robots are generally free from such troubles thanks to low ground pressure.

A crawler robot includes left and right crawler devices. Each of the crawler devices includes front and rear wheels and an endless crawler belt run around the wheels.

The wheels and the crawler belt are engageable with each other for torque transmission. For example, Patent Document 1 (Japanese Unexamined Patent Application Publication No. 2006-168661) discloses a crawler device including wheels and a crawler belt. Projections are provided in peripheral surfaces of the wheels. The projections are arranged in a circumferential direction equally spaced from each other. Engagement holes to be engaged with the projections are formed in the crawler belt.

When the robot disclosed in Patent Document 1 moves on the soft ground for underwater exploration, sand and/or mud may enter between the crawler belt and the wheels, resulting in undesirable events such as disengagement of the projections from the engagement holes that may cause the crawler belt to come off the wheels, damage and eventual breaking of the crawler belt and excessive tension acting on the crawler belt.

The undesirable events associated with the robot of Patent Document 1 mentioned above should basically be solved by engaging a crawler belt with wheels only by frictional force as disclosed in Patent Document 2 (Japanese Unexamined Patent Application Publication No. 2002-178962) and Patent Document 3 (Japanese Unexamined Patent Application Publication No. 2004-276685). Detailed description of the crawler devices of Patent Documents 2 and 3 are given below.

In the crawler device of Patent Document 2, an annular groove is formed around a central portion of an outer periphery of the wheel and left and right portions of the outer periphery serve as receiving surfaces. Rigid engagement elements are formed in each of the receiving surfaces such that the engagement elements are arranged in a circumferential direction spaced from each other. On the other hand, the crawler belt is made of rubber. Engagement projections are formed around a central portion of an inner periphery of the crawler belt such that the engagement projections are spaced from each other.

The engagement projections of the crawler belt enter the annular groove of the wheel. At the same time, the inner periphery of the crawler belt contacts outer surfaces of the engagement elements of the wheel and bite into engagement grooves between the engagement elements. Thanks to these features, torque can be transmitted by frictional force only.

The engagement of the engagement projections with the annular groove prevents the crawler belt from being displaced from the wheel in the width direction, thereby preventing the crawler belt from coming off the wheel. Moreover, the engagement grooves also serve to remove sand and/or mud.

The crawler device disclosed in Patent Document 3 has similar features as the crawler device disclosed in Patent Document 2. Specifically, an annular groove is formed around a central portion of an outer periphery of the wheel and left and right portions of the outer periphery serve as receiving surfaces. First crawler grooves for facilitating frictional engagement are formed in each of the receiving surfaces such that the crawler grooves are arranged in a circumferential direction spaced from each other. On the other hand, the crawler belt is made of rubber. Engagement projections are formed around a central portion of an inner periphery of the crawler belt such that the engagement projections are spaced from each other. The engagement projections of the crawler belt are adapted to enter the annular groove of the wheel. Second crawler grooves for facilitating the frictional engagement are formed in left and right portions of the inner periphery of the crawler belt.

SUMMARY OF THE PRESENT DISCLOSURE

Problem to be Solved by the Present Disclosure

In the crawler devices disclosed in Patent Documents 2 and 3, however, sand and/or mud may enter between the annular groove of the wheel and the engagement projections of the crawler belt. Therefore, the possibilities of the undesirable events such as the crawler belt coming off the wheels and the crawler belt receiving damages and excessive tension cannot be eliminated.

The present disclosure may provide a crawler device including: a wheel support extending in a front-rear direction; wheels respectively rotatably supported at a front portion and a rear portion of the wheel support; and a crawler belt made of an endless elastic material. The crawler belt is run around the wheels at the front and rear portions of the wheel support. Each of the wheels comprises a rigid wheel body and an exterior part made of an elastic material. The exterior part is fixed to an outer periphery of the wheel body. Raised portions are formed in an outer periphery of the exterior part of the wheel such that the raised portions continuously extend in a width direction and are arranged in a circumferential direction spaced from each other. Drain grooves extending through the exterior part in the width direction are formed between the raised portions. Top surfaces of the raised portions of the exterior part of the wheel surface-contact an inner peripheral surface of the crawler belt with a frictional force working therebetween. Restriction members are provided in the wheel support or the wheel bodies to stop opposite side edges of the crawler belt, thereby restricting the crawler belt from being displaced with respect to the wheels in the width direction.

In the crawler device having the features given above, the wheels and the crawler belt are engaged only by the surface contact accompanied by frictional force instead of engagement of projections and engagement holes. As a result, the crawler belt can be prevented from coming off the wheels caused by sand and/or mud that entered between the wheel and the crawler belt, and from being damaged or having excessive tension applied to the crawler belt.

Each of the wheels has an exterior part made of an elastic material, and elasticity of the exterior part can enhance the frictional engagement.

The raised portions formed in the exterior part continuously extend in the width direction of the exterior part, and the drain grooves formed between the raised portions extend through in the width direction of the exterior part. Therefore, sand and/or mud that entered between the wheels and the crawler belt do not stay in a central portion of the exterior part, and can be smoothly removed from the drain grooves to the outside.

Since the opposite side edges of the crawler belt are stopped by the restriction members, the crawler belt can be prevented from being displaced with respect to the wheels without providing a restriction means in a central portion of the crawler belt.

The wheel support may include a pair of left and right side plates. The wheels are disposed between the pair of side plates and the restriction members are provided in circumferential edges of the side plates at least in parts of regions of the circumferential edges of the side plates corresponding to the wheels.

These features can prevent the crawler belt from being displaced in the width direction by a relatively simple structure.

The restriction members may be provided in opposite side surfaces of the wheel body and the restriction members are protruded form the outer periphery of the wheel body in a radial direction, thereby stopping opposite side edges of the crawler belt.

These features can also prevent the crawler belt from being displaced in the width direction by a relatively simple structure.

A width of the crawler belt may be greater than a width of the exterior parts of the wheels and spaces are formed between opposite side surfaces of the exterior parts and the restriction members.

These features enable sand and/or mud to be smoothly removed from the drain grooves to the outside via the spaces even when the crawler belt is stopped by the restriction members over relatively long distances.

The crawler belt may be removable from the wheels, the restriction members are removable from the wheel support or the wheel bodies, and the raised portions of the exterior parts serve as tread lugs in a condition where the crawler belt and the restriction members are removed.

These features enable the crawler device to be converted to a wheeled travel device.

In another embodiment of the restriction member, restriction projections are provided in opposite side edges of the crawler belt over an entire circumference of the crawler belt. The restriction projections are protruded from the inner peripheral surface of the crawler belt. The restriction projections are stopped by opposite side surfaces of the exterior part such that the restriction projections only partially cover openings at opposite ends of the drain grooves.

These features also enable the crawler belt to be prevented from being displaced with respect to the wheels in the width direction without restriction means provided in a central portion of the crawler belt.

The crawler belt may include a base portion and a friction layer formed in an entire inner periphery of the base portion. The friction layer has a higher coefficient of friction than the base portion. The friction layer surface contacts the top surfaces of the raised portions of the exterior parts.

These features enable the frictional engagement of the wheel and the crawler belt to be enhanced.

Another aspect of the present disclosure provides a crawler robot including a body and the crawler devices disposed to the left and right of the body.

The crawler device according to the present disclosure can move on the soft ground such as sandy soil or muddy soil in a stable manner without the crawler belt coming off or being damaged or having excessive tension applied thereto.

DESCRIPTION OF THE PRESENT DISCLOSURE

A lightweight small crawler robot for underwater exploration according to a first embodiment of the present disclosure will be described hereinafter with reference to the drawings.

Figure 1:
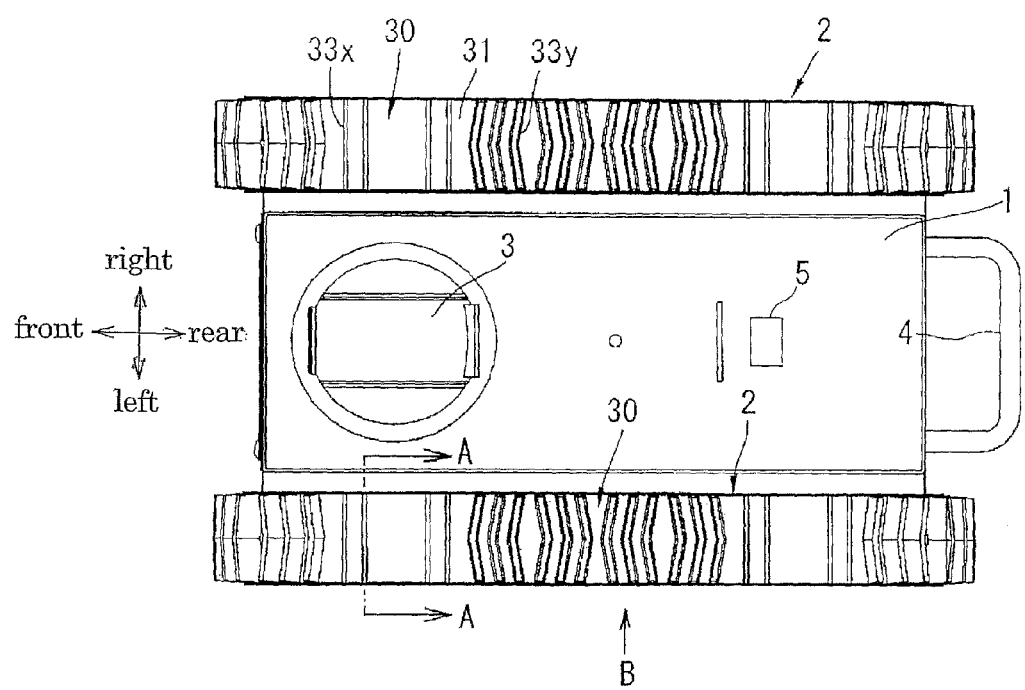
FIG. 1 is a plan view of a crawler robot for underwater exploration including crawler devices according to a first embodiment of the present disclosure.

A basic structure of the robot will be described first. Front, rear, left and right directions are indicated by arrows in FIG. 1 to facilitate understanding. The robot includes a body 1 having an elongated configuration in the front-rear direction and a pair of crawler devices 2 disposed to the left and right of the body 1.

A video camera 3 is mounted in a front portion of the body 1. A grip 4 is fixed in a rear portion of the body 1. The grip 4 is provided to be gripped for carrying the robot.

The body 1 further has a transceiver 5 mounted thereon. The transceiver 5 can transmit and receive signals to and from another transceiver at a base station (not shown) remote from the robot. An operator will control movement of the robot by operating a remote controller at the base station, viewing images taken by the video camera 3. When the robot is used underwater such as for underwater exploration, the movement of the robot is controlled by signals sent and received via a cable connecting the robot and the base station on a mother ship.

Various kinds of accessories and sensors such as a robot arm may be mounted on the body 1 according to tasks required of the robot.

Figure 2:
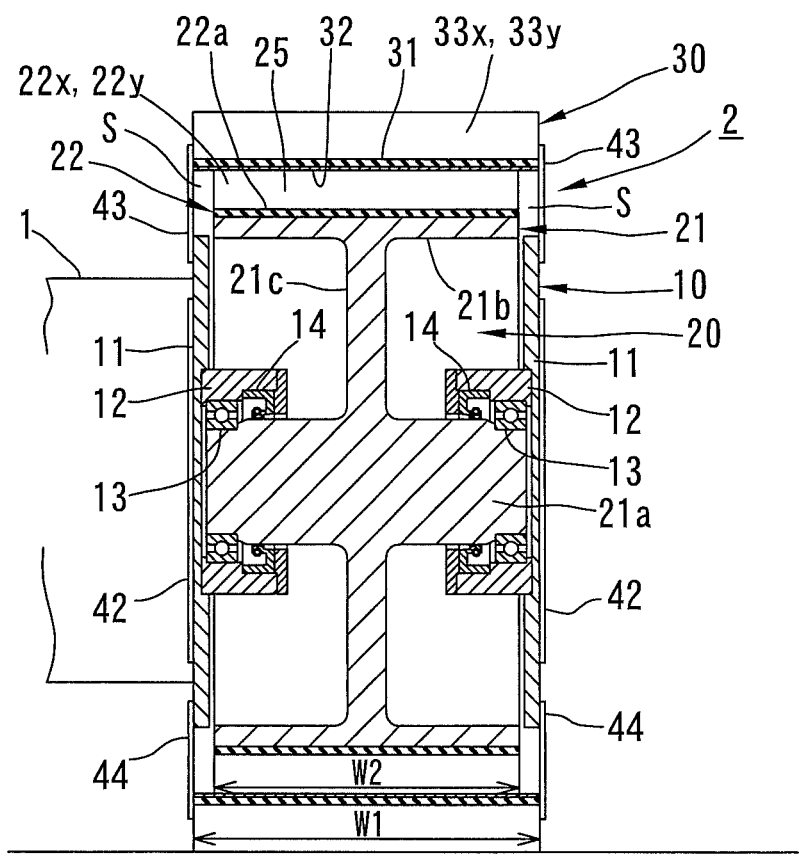
FIG. 2 is a cross-sectional view of the crawler device of FIG. 1 taken along line A-A.
Figure 3:
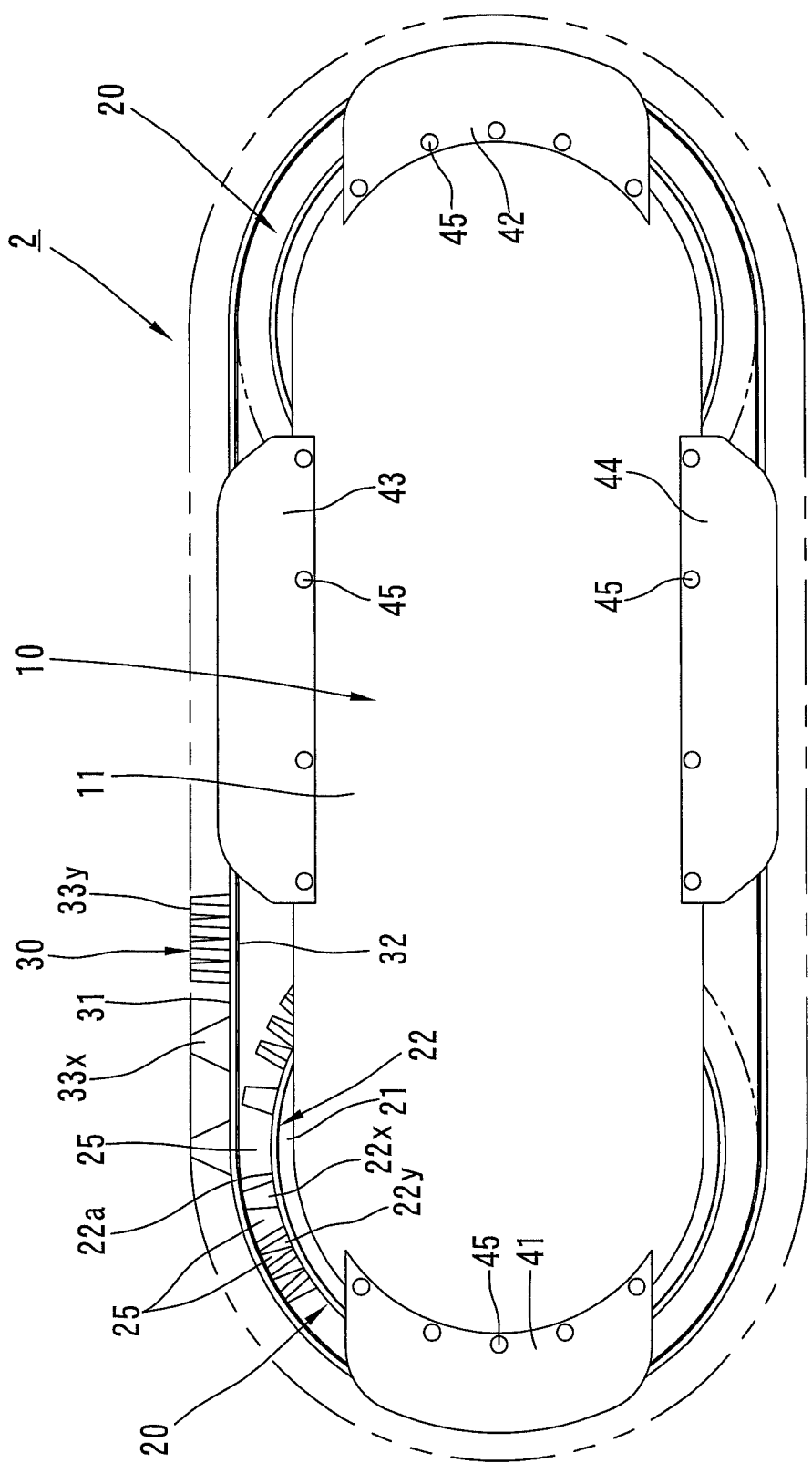
FIG. 3 is a side view of the crawler device of FIG. 1 viewed from direction B.

As shown in FIGS. 2 and 3, each of the crawler devices 2 includes a wheel support 10 extending in the front-rear direction, wheels 20 and an endless crawler belt 30. The wheels 20 are respectively rotatably supported by front and rear end portions of the wheel support 10. The crawler belt 30 is run around the wheels 20.

The wheel support 10 has a pair of left and right rigid side plates 11 made of metal and extending in the front-rear direction. The side plates 11 are fixed to each other via a connecting member (not shown) at central portions thereof. Supports 12 having a short circular cylindrical configuration are fixed to inner surfaces of the side plates 11 at portions corresponding to the wheels 20.

Each of the wheels 20 includes a rigid wheel body 21 made of metal and a tire 22 (exterior part) made of rubber (elastic material) fixed around an outer periphery of the wheel body 21.

The wheel body 21 has an axle 21a, a circular cylindrical portion 21b coaxial with the axle 21a and a connecting portion 21c connecting the axle 21a and the circular cylindrical portion 21b.

Left and right end portions of the axle 21a are rotatably supported by the supports 12 of the left and right side plates 11 via bearings 13. Reference sign 14 indicates an annular oil seal.

FIG. 2 shows the front wheel 20 that acts as a trailing wheel. The rear wheel 20 that acts as a driving wheel has the same construction. However, the axle 21a of the rear wheel 20 extends into the body 1, and the extended shaft portion of the axle 21a is connected to a motor (not shown) integrated in the body 1. It is to be understood that the front wheel 20 may act as a driving wheel with the rear wheel 20 acting as a trailing wheel. Alternatively, both of the front and rear wheels 20 may act as driving wheels 20.

The tire 22 of the wheel 20 has a base portion 22a and a multitude of tread lugs 22x, 22y (raised portions). The base portion 22a has a circular cylindrical configuration and is fixed to the outer periphery of the wheel body 21. The tread lugs 22x, 22y are formed in an outer periphery of the base portion 22a such that the tread lugs 22x, 22y are protruded from the base portion 22a and are arranged in a circumferential direction spaced from each other. The tread lugs 22x, 22y have a same height, extend continuously in a width direction of the tire 22 and have a same width as the base portion 22a. Top surfaces of the tread lugs 22x, 22y form parts of a circular cylindrical surface about an axis of the wheel.

Gaps between the tread lugs 22x, 22y are provided as drain grooves 25 extending through in a width direction of the tire 22.

In this embodiment, two kinds of the thread lugs 22x, 22y that are different in thickness (dimension in the circumferential direction) and shape are formed, which will be described later.

The crawler belt 30 is made of rubber (elastic material). The crawler belt 30 integrally includes a base portion 31 having a configuration of an endless flat belt, a friction layer 32 formed in an inner periphery of the base portion 31 and a multitude of tread lugs 33x, 33y. The tread lugs 33x, 33y are formed in an outer periphery of the base portion 31 such that the tread lugs 33x, 33y are protruded from the base portion 31 and are arranged to be spaced from each other. It is to be understood that the crawler belt 30 may have a high-tensile-strength member such as an endless steel belt, an endless wire and a non-woven cloth embedded in the rubber material.

As shown in FIG. 2, a width W1 of the crawler belt 30 is greater than a width W2 of the tire 22, and when the crawler belt 30 is run around the wheels 20, opposite edges of the crawler belt 30 protrude from opposite edges of the tire 22 in the width direction.

The friction layer 32 is made by bonding a thin sheet that includes adhesive material having abrasive grains mixed therein to the base portion 31, for example. The friction layer 32 includes microscopic asperities, and has much higher coefficient of friction than the base portion 31. With the friction layer 32 contacting the top surfaces of the tread lugs 22x, 22y of the tire 22, the crawler belt 30 and the wheels 20 can be prevented from relatively displaced (sliding) in the circumferential direction by frictional force working between the friction layer 32 and the top surfaces of the tread lugs 22x, 22y (frictionally engaged).

As described above, torque can be transmitted by the frictional engagement of the wheels 20 and the crawler belt 30 by the surface contact only. This eliminates the necessity of forming projections in the wheels 20 and engagement holes in the crawler belt 30 for torque transmission.

Alternatively, an elastically deformable layer may be formed instead of the friction layer 32 to facilitate frictional engagement with the tread lugs 22x, 22y.

The crawler belt 30 of this embodiment includes two kinds of tread lugs 33x, 33y that are different in thickness (dimension in circumferential direction) and shape. Specifically, the outer periphery of the base portion 31 includes first tread lug formation regions that are relatively short and second tread lug formation regions that are relatively long, alternately arranged in the circumferential direction. A predetermined number, for example, two, of the tread lugs 33x are disposed in each of the first tread lug formation regions such that the tread lugs 33x are spaced from each other. A multitude of the tread lugs 33y are disposed in each of the second tread lug formation regions such that the tread lugs 33y are spaced from each other.

The tread lugs 33x are thick, have a high flexural rigidity in the circumferential direction of the crawler belt 30 and extend straight in the width direction. The tread lugs 33y are thin, have a low flexural rigidity in the circumferential direction of the crawler belt 30 and have a V-shaped bent configuration in plan view.

The tread lugs 22x, 22y of the wheels 20 mentioned above respectively have similar shapes to the tread lugs 33x, 33y of the crawler belt 30.

Restriction members 41, 42, 43, 44 (restriction means) that are four flat panels, for example, are fixed in circumferential edges of an outer surface of each of the left and right side plates 11 such that the restriction members 41, 42, 43, 44 are arranged in the circumferential direction of the crawler belt 30 spaced from each other. The restriction members 41, 42 have a same shape, are respectively fixed to front and rear edges of the side plates 11 with screws 45 and are protruded from the front and rear edges in the front-rear direction. The restriction members 43, 44 are respectively fixed to upper and lower edges of the side plates 11 with screws 45 and are protruded from the upper and lower edges in the vertical direction.

The restriction members 41 disposed in the front edges of the pair of side plates 11 prevent the crawler belt 30 from coming off the wheel 20 at the front by stopping opposite side edges of the crawler belt 30 run around the wheel 20 at the front.

Similarly, the pair of restriction members 42 disposed at the rear prevent the crawler belt 30 from coming off the wheel 20 at the rear by stopping opposite side edges of the crawler belt 30 run around the wheel 20 at the rear.

Since the width W1 of the crawler belt 30 is greater than the width W2 of the tire 22 as mentioned above, spaces S are formed between the restriction members 41, 42 and opposite side surfaces of the tire 22.

The pair of restriction members 43 disposed in the upper side restrict displacement of an upper portion of the crawler belt 30 run around the front and rear wheels 20 in the width direction. The pair of restriction members 44 in the lower side restrict displacement of a lower portion of the crawler belt 30 run around the front and rear wheels 20 in the width direction.

Operation of the crawler robot described above will be described briefly. Each of the crawler devices 2 can be driven in normal and reverse directions by a motor (not shown)

incorporated in the body 1, which causes the robot to move forward and rearward, turn right and left, and make a pivot turn (turn-in-place).

When the robot described above moves on the soft ground on the seafloor such as sandy soil and muddy soil, the robot can move stably because the left and right crawler devices 2 elongated in the front-rear direction can move without digging deep into the soft ground, creating a low ground pressure only.

The robot described above can also ride over steps and/or bumps (obstacles) because the robot has high tread lugs 33$x$, 33$y$. Particularly in this embodiment, when the robot, while moving, bumps into a step or a bump, the thin tread lugs 33$y$ having low flexural rigidity are bent and the thick tread lugs 33$x$ having high flexural rigidity catch a nosing of the step or the bump. This feature enables the robot to ride over steps and/or bumps even when they are high.

Even when sand and/or mud enter between the tires 22 and the crawler belt 30 while the robot is moving, the robot is free from an undesirable event of the crawler belt 30 riding over projections of the wheels 20 because the tires 22 and the crawler belt 30 are frictionally engaged only, not engaged via engagement between projections and engagement holes as is the case with conventional devices. Moreover, the sand and/or mud that entered between the tires 22 and the crawler belt 30 can be removed through the drain grooves 25 formed in the tires 22.

Since the tread lugs 22$x$, 22$y$ of the tire 22 extend continuously in the width direction and therefore, the drain grooves 25 extend continuously in the width direction, sand and/or mud can be smoothly removed without remaining in a central portion.

Since opposite side edges of the crawler belt 30 in the width direction are stopped by the restriction members 41, 42, 43, 44, the crawler belt 30 can be prevented from being displaced in the width direction and from coming off the wheel 20.

In order to prevent the crawler belt 30 from wobbling in the width direction and from coming loose, it is effective to apply tension to the crawler belt 30 in addition to providing the restriction members 41, 42, 43, 44. Methods to apply tension to the crawler belt 30 include putting the crawler belt 30 around the wheels 20 beforehand and then widening a distance between the wheels 20 by connecting the wheels 20 to the axle by wedge fitting, thereby applying tension to the crawler belt 30. In another method, a tensile force may be applied to the crawler belt 30 by a tensioning mechanism.

While the restriction members 41, 42 stop the crawler belt 30 run around the wheels 20 over a relatively long distance, the restriction members 41, 42 do not disturb elimination of sand and/or mud because the spaces S are formed between the restriction members 41, 42 and the tires 22 of the wheels 20.

The crawler robot according to this embodiment can be converted to a wheeled robot by removing the restriction members 41, 42, 43, 44 from the side plates 11 and removing the crawler belt 30 from the wheels 20. In the converted wheeled robot, the tread lugs 22$x$, 22$y$ of the wheels 20 contact a ground surface. This robot is more suitable for moving on the ground than moving underwater. The tread lugs 22$x$, 22$y$ have a similar functionality to ride over steps and/or bumps as that of the tread lugs 33$x$, 33$y$ of the crawler robot 30, and detailed description thereof will be omitted.

Even if the restriction members 41, 42, 43, 44 and the crawler belt 30 cannot be removed, manufacturing cost can be reduced because a crawler robot and a wheeled robot can share a main portion.

To facilitate the removal of sand and/or mud, a plurality of drain windows may be formed in the restriction members 41, 42, 43, 44 such that the drain windows are arranged in the circumferential direction of the crawler belt 30 spaced from each other.

The restriction members may be fixed to the side plates all along the peripheral edges of the crawler belt. In this case, a plurality of drain windows are formed in the restriction members such that the drain windows are arranged in the circumferential direction spaced from each other.

Other embodiments of the present disclosure will be described next with reference to the drawings. In the description of other embodiments, same reference numerals will be assigned to features corresponding to those of the first embodiment, and explanation thereof will be omitted.

Figure 4:
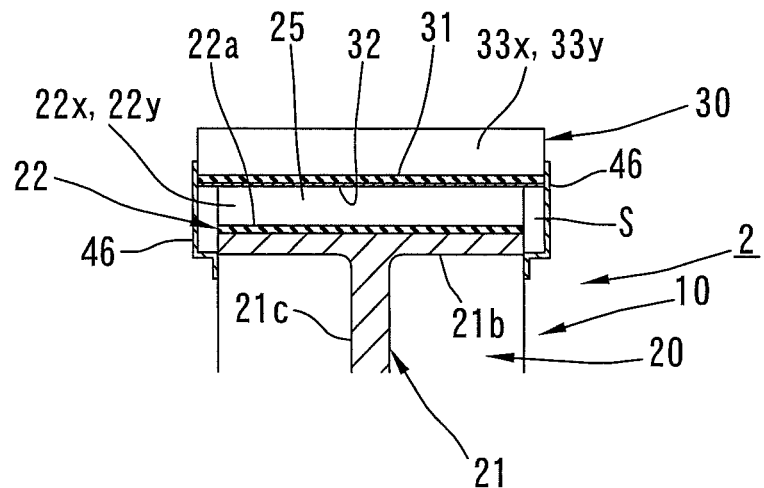
FIG. 4 is a partial cross-sectional view of the crawler device according to a second embodiment of the present disclosure.

In a second embodiment shown in FIG. 4, a plurality of restriction members 46 having a plate configuration are fixed to the opposite side surfaces of the wheel body 21 of the wheel 20 such that the restriction members 46 are arranged in the circumferential direction spaced from each other. The restriction members 46 are protruded from the outer periphery of the wheel body 21 in a radial direction, stopping the opposite side edges of the crawler belt 30.

The restriction members 46 having an annular shape may be fixed to the wheel body 21 all along the peripheral edges of the wheel body 21. In this case, a plurality of windows for eliminating sand and/or mud may be formed in the annular restriction members 46 such that the windows are arranged in the circumferential direction spaced from each other.

In the second embodiment, the body of the robot also serves as a wheel support since the side plates 11 of the first embodiment are not provided in the second embodiment.

Figure 5:
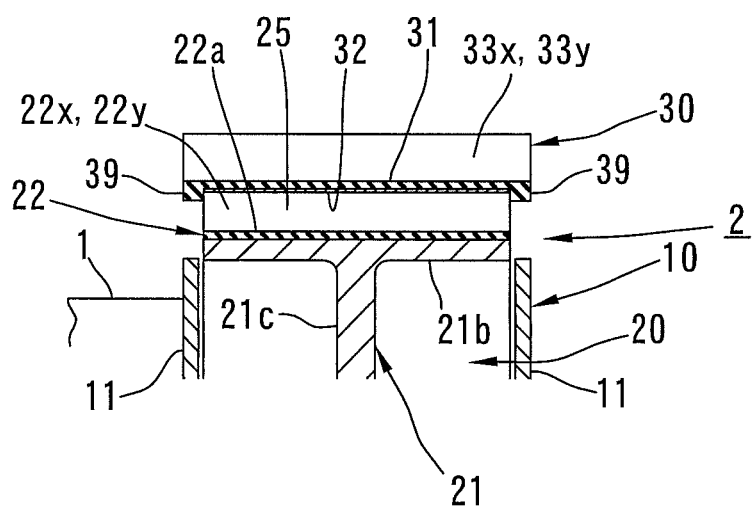
FIG. 5 is a partial cross-sectional view of the crawler device according to a third embodiment of the present disclosure.

In a third embodiment shown in FIG. 5, a pair of restriction projections 39 (restriction means) are integrally formed in opposite side edges of the base portion 31 of the crawler belt 30 over an entire circumference of the crawler belt 30. The pair of restriction projections 39 are protruded in the radial direction from the inner periphery of the crawler belt 30.

The crawler belt 30 is prevented from being displaced with respect to the wheels 20 in the width direction by the pair of restriction projections 39 stopped by the opposite side surfaces of the tires 22.

Since a height of projection of the restriction projections 39 from the inner periphery of the base portion 31 is smaller than a height of projection of the tread lugs 22$x$, 22$y$ from the base portion 22$a$, the restriction projections 39 cover only portions of openings in the opposite ends of the drain grooves 25. Therefore, the restriction projections 39 do not affect the functionality of the drain grooves 25 to eliminate sand and/or mud.

The present disclosure is not limited to the embodiments described above, and various other embodiments may be possible.

For example, the raised portions of the tires of the wheels may be formed without paying attention to ground contact functionalities. The raised portions and the drain grooves may be inclined with respect to the axes of the wheels.

The present disclosure can also be applied to a flipper robot having a pair of left and right crawler devices at a front end of the body and having another pair of left and right crawler devices at a rear end of the body. Each of these crawler devices may be rotated about a rotational axis extending horizontally in a left-right direction.

INDUSTRIAL APPLICABILITY

The unmanned crawler device and crawler robot according to the present disclosure is suitable for moving on the soft ground such as seafloor.

The invention claimed is:

1. A crawler device comprising:

a wheel support extending in a front-rear direction;

wheels respectively rotatably supported at a front portion and a rear portion of the wheel support; and a crawler belt made of an endless elastic material, the crawler belt run around the wheels at the front and rear portions of the wheel support;

wherein each of the wheels comprises a rigid wheel body and an exterior part made of an elastic material, the exterior part fixed to an outer periphery of the wheel body;

the exterior part comprises a base portion and raised portions, the base portion fixed to the outer periphery of the wheel body, the raised portions formed in an outer periphery of the base portion such that the raised portions continuously extend in a width direction and are arranged in a circumferential direction spaced from each other;

drain grooves extending through the exterior part in the width direction are formed between the raised portions;

top surfaces of the raised portions of the exterior part of the wheel having a surface-to-surface contact with an inner peripheral surface of the crawler belt with a frictional force working therebetween;

restriction projections are provided in opposite side edges of the crawler belt over an entire circumference of the crawler belt to restrict the crawler belt from being displaced with respect to the wheels in the width direction, the restriction projections protruded from the inner peripheral surface of the crawler belt, the restriction projections stopped by opposite side surfaces of the exterior part; and, a height of the restriction projections of the crawler belt protruded from an inner periphery of the crawler belt is smaller than a height of the raised portions of the exterior part protruded from the outer periphery of the base portion, causing the restriction projections to only partially cover openings at opposite ends of the drain grooves, thereby allowing the drain grooves to communicate with outside through opposite end openings thereof.

2. The crawler device according to claim 1, wherein the crawler belt comprises a base part made of elastic material and a friction layer formed in an entire inner periphery of the base part, the friction layer having a higher coefficient of friction than the base part, and the friction layer having the surface-to-surface contact with the top surfaces of the raised portions of the exterior part.

3. The crawler device according to claim 2, wherein the friction layer includes abrasive grains.

4. The crawler device according to claim 1, wherein the raised portions of the exterior part continuously extend over an entire width of the base portion of the exterior part.

5. A robot comprising a robot body and first and second crawler devices according to claim 1, wherein the first and second crawler devices are disposed to the left and right of the robot body respectively.

* * * * *